United States Patent
Debevec et al.

(10) Patent No.: US 10,469,831 B2
(45) Date of Patent: Nov. 5, 2019

(54) NEAR-INSTANT CAPTURE OF HIGH-RESOLUTION FACIAL GEOMETRY AND REFLECTANCE

(71) Applicant: UNIVERSITY OF SOUTHERN CALIFORNIA, Los Angeles, CA (US)

(72) Inventors: Paul E. Debevec, Culver City, CA (US); Graham Leslie Fyffe, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 147 days.

(21) Appl. No.: 14/640,813

(22) Filed: Mar. 6, 2015

(65) Prior Publication Data

US 2016/0261850 A1    Sep. 8, 2016

Related U.S. Application Data

(60) Provisional application No. 61/948,884, filed on Mar. 6, 2014, provisional application No. 62/128,888, filed on Mar. 5, 2015.

(51) Int. Cl.
*H04N 13/243*    (2018.01)
*G06K 9/00*    (2006.01)
(Continued)

(52) U.S. Cl.
CPC ....... *H04N 13/243* (2018.05); *G06K 9/00221* (2013.01); *G06T 15/04* (2013.01);
(Continued)

(58) Field of Classification Search
CPC ........... H04N 13/0242; H04N 13/0253; G06K 9/00221; G06T 15/04
(Continued)

(56) References Cited

U.S. PATENT DOCUMENTS 7,044,613 B2 *   5/2006   Debevec ................ G03B 15/02
                                             348/E5.058
7,218,774 B2 *   5/2007   Liu ..................... G06K 9/00275
                                             345/473
(Continued)

OTHER PUBLICATIONS

Ma W-C., T. Hawkins, P. Peers, C-F. Chabert, M. Weiss, P. Debevec571, "Rapid Acquisition of Specular and Diffuse Normal Maps from Polarized Spherical Gradient Illumination", Eurographics Symposium on rendering 2007.*
(Continued)

*Primary Examiner* — Richard A Hansell, Jr.
(74) *Attorney, Agent, or Firm* — Snell & Wilmer LLP

(57) ABSTRACT

A system may almost instantly capturing high-resolution geometry and reflectance data of a portion of a human subject. The system may include multiple cameras, each oriented to controllably capture an image of the portion of the human subject from a different location in space; multiple lights, each oriented to controllably illuminate the portion of the human subject from a location in space significantly different than the location in space of the other lights; and a controller. The controller may divide the cameras into subgroups with each subgroup of cameras containing at least one camera and with each camera belonging to only one of the subgroups; cause each subgroup of cameras to sequentially capture a single image of the portion of the human subject; and cause at least one of the lights to light while each subgroup of cameras captures a single image of the portion of the human subject. The system may include an image processing system that generates the high resolution geometry and reflectance data based on only one image from each camera.

A polarizing optical element may be between each camera and the portion of the human subject. A polarizer filter may be between each light and the portion of the human subject.

(Continued)

A controller may cause all of the cameras to simultaneously capture a single image of the portion of the human subject while the portion of the human subject is illuminated by all of the lights. The specular reflections from the portion of the human subject that are captured by one of the cameras may have a color distribution across the portion of the human subject that is different than the specular reflections from the portion of the human subject that are captured by another of the cameras.

20 Claims, 10 Drawing Sheets

(51) Int. Cl.
*G06T 15/04* (2011.01)
*H04N 13/254* (2018.01)
*H04N 13/296* (2018.01)
*H04N 13/257* (2018.01)

(52) U.S. Cl.
CPC ......... *H04N 13/254* (2018.05); *H04N 13/296* (2018.05); *G06T 2207/10012* (2013.01); *G06T 2215/12* (2013.01); *H04N 13/257* (2018.05)

(58) Field of Classification Search
USPC .......................................................... 348/47
See application file for complete search history.

(56) References Cited

U.S. PATENT DOCUMENTS

| 8,264,490 | B2 | 9/2012 | Debevec et al. | |
|---|---|---|---|---|
| 8,300,234 | B2 | 10/2012 | Debevec et al. | |
| 8,988,599 | B2 | 3/2015 | Debevec et al. | |
| 9,123,116 | B2 | 9/2015 | Debevec et al. | |
| 9,325,886 | B2* | 4/2016 | Kim | H04N 5/2254 |
| 2004/0201586 | A1* | 10/2004 | Marschner | G06K 9/4661 |
| | | | | 345/426 |
| 2006/0284996 | A1* | 12/2006 | Kanai | H04N 5/232 |
| | | | | 348/294 |
| 2008/0304081 | A1* | 12/2008 | Debevec | G01B 11/25 |
| | | | | 356/612 |
| 2009/0226049 | A1* | 9/2009 | Debevec | G06K 9/00221 |
| | | | | 382/118 |
| 2011/0102550 | A1* | 5/2011 | Daniel | G06T 7/55 |
| | | | | 348/46 |
| 2012/0262594 | A1* | 10/2012 | Koizumi | H04N 5/2254 |
| | | | | 348/218.1 |
| 2012/0268571 | A1* | 10/2012 | Debevec | H04N 13/282 |
| | | | | 348/48 |
| 2014/0104481 | A1* | 4/2014 | Spears | G03B 17/54 |
| | | | | 348/342 |

OTHER PUBLICATIONS

Ma W-C., T. Hawkins, P. Peers, C-F. Chabert, M. Weiss, P. Debevec, "Rapid Acquisition of Specular and Diffuse Normal Maps from Polarized Spherical Gradient Illumination", Eurographics Symposium on rendering 2007 (Year: 2007).*

* cited by examiner

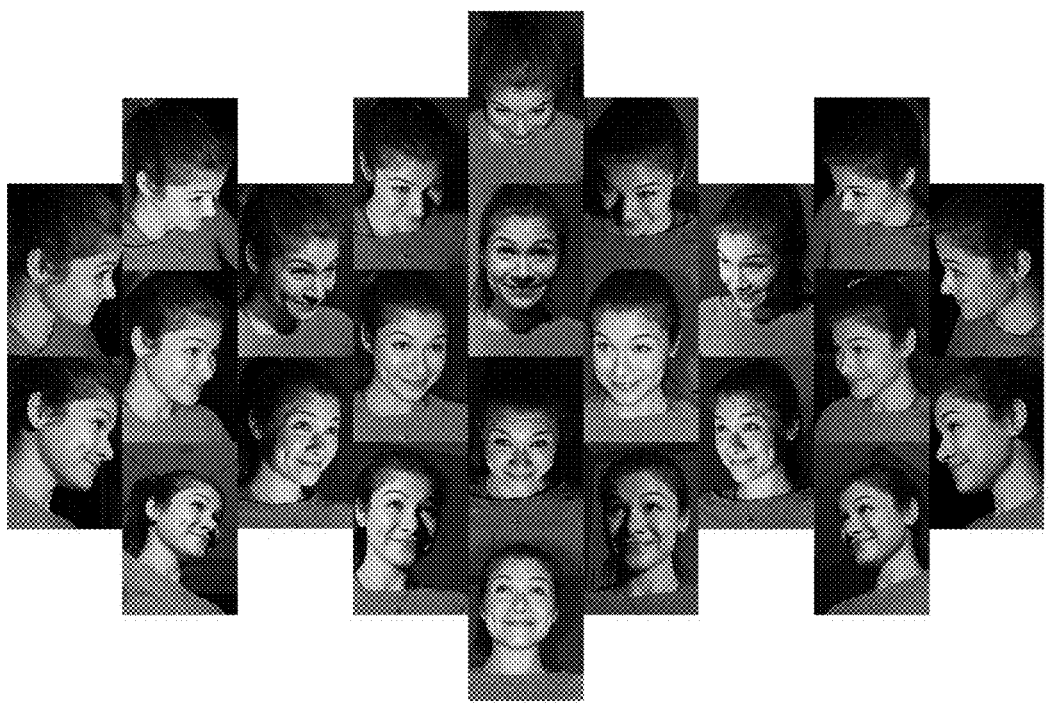
FIG. 1A
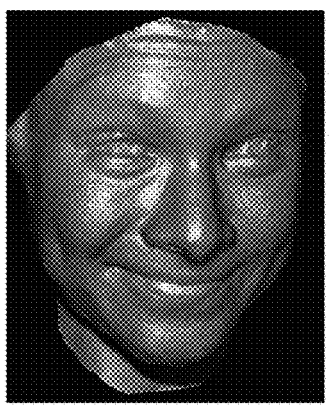 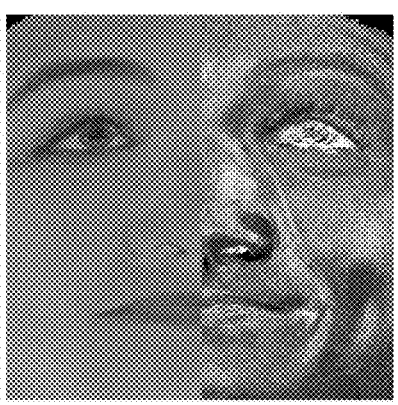 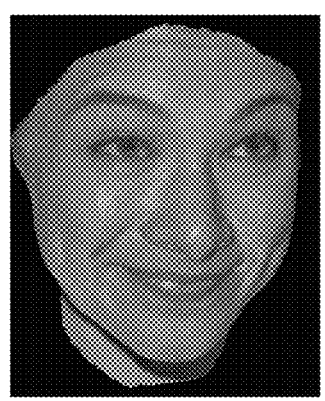
FIG. 1B     FIG. 1C     FIG. 1D

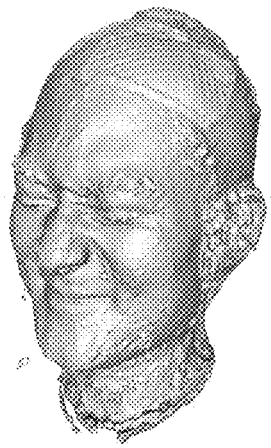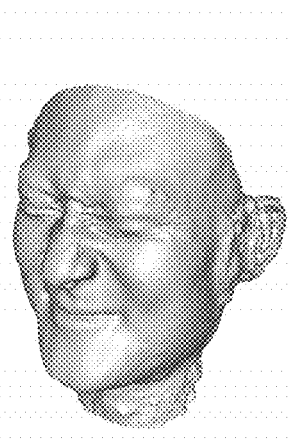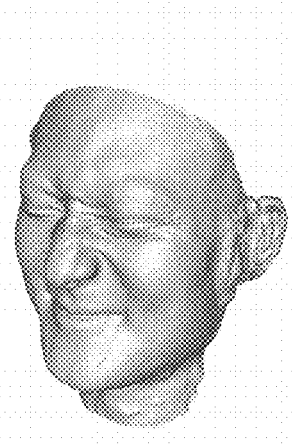
FIG. 6A    FIG. 6B    FIG. 6C
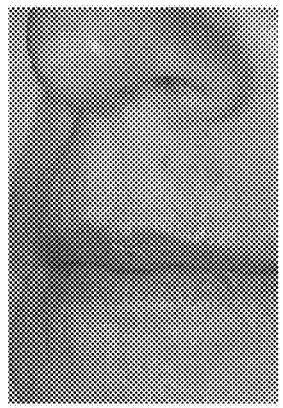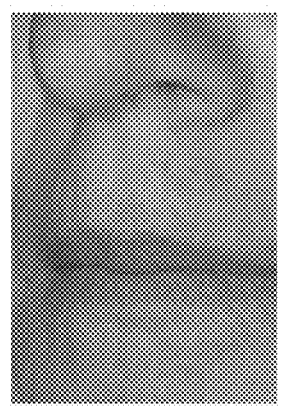
FIG. 7A    FIG. 7B    FIG. 7C

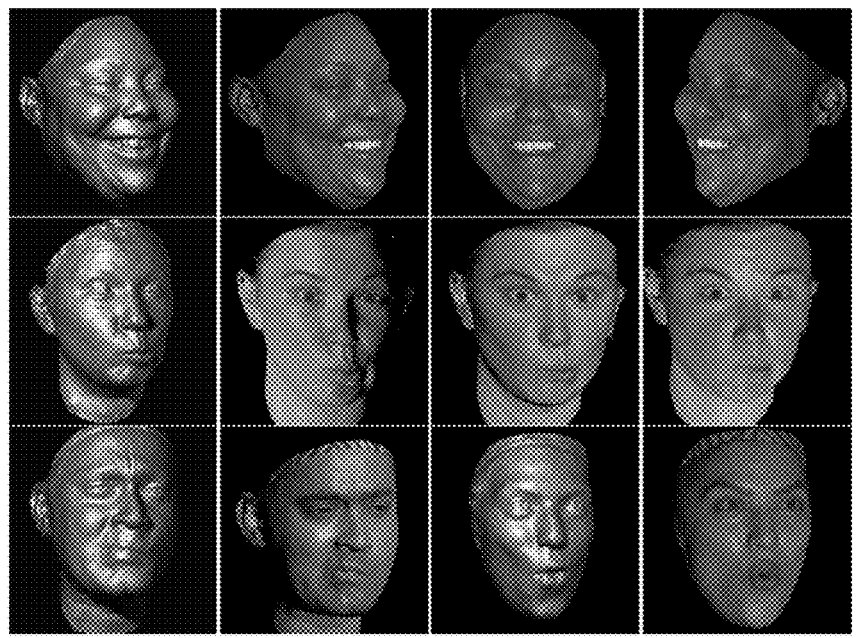
FIG. 10
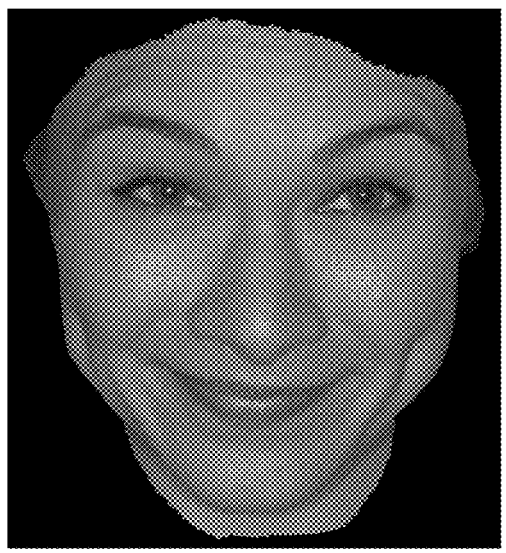 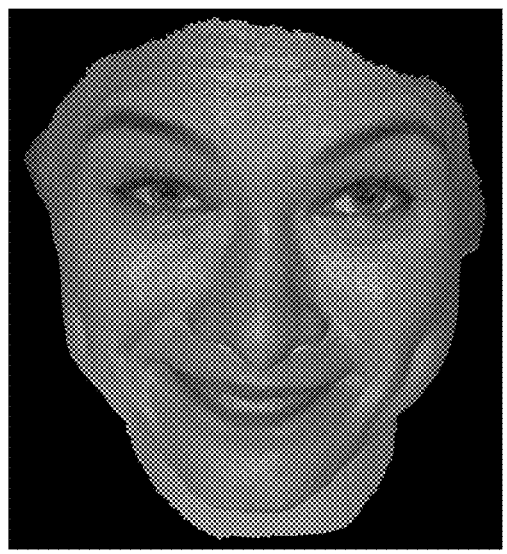
FIG. 11A  FIG. 11B

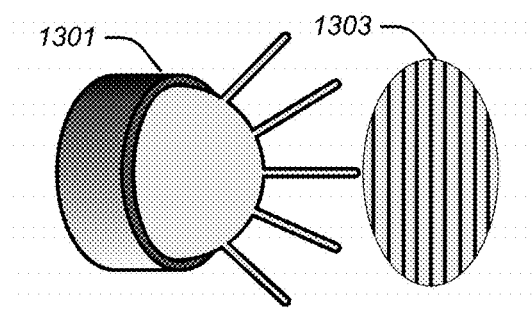
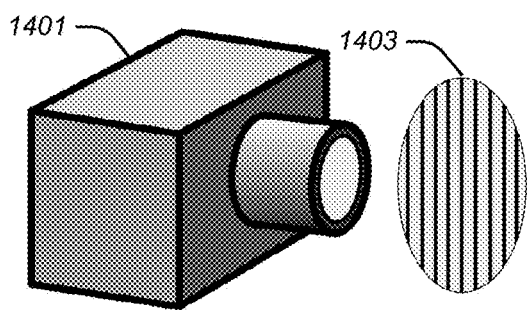
FIG. 13          FIG. 14
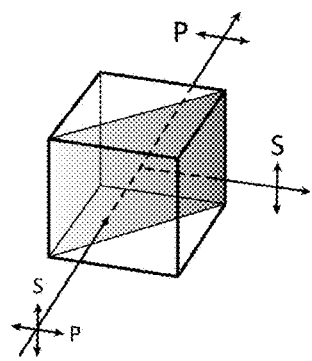
FIG. 15

NEAR-INSTANT CAPTURE OF HIGH-RESOLUTION FACIAL GEOMETRY AND REFLECTANCE

CROSS-REFERENCE TO RELATED APPLICATIONS

This application is based upon and claims priority to U.S. provisional patent application 61/948,884, entitled "NEAR-INSTANT CAPTURE OF HIGH-RESOLUTION FACIAL GEOMETRY AND REFLECTANCE," filed Mar. 6, 2014, and U.S. provisional patent application 62/128,888, entitled "SINGLE-SHOT REFLECTANCE MEASUREMENT FROM POLARIZED COLOR GRADIENT ILLUMINATION," filed Mar. 5, 2015.

This application is also related to U.S. patent application Ser. No. 13/449,729, filed Apr. 18, 2012, entitled "Multiview Face Capture Using Polarized Spherical Gradient Illumination,"; U.S. patent application Ser. No. 12/872,433, filed Aug. 31, 2010, entitled "Illumination Sphere with Intelligent LED Lighting Units in Scalable Daisy Chain with Interchangeable Filters,"; U.S. patent application Ser. No. 12/803,398, filed Jun. 24, 2010 (now U.S. Pat. No. 8,300,234, issued Oct. 30, 2012), entitled "Estimating Spectral Distribution of Reflections from Object Surface Based on Low Frequency Illumination,"; U.S. patent application Ser. No. 12/364,370, filed Feb. 2, 2009 (now U.S. Pat. No. 8,264,490, issued Sep. 11, 2012); and U.S. patent application Ser. No. 10/165,359, filed Jun. 7, 2002 (now U.S. Pat. No. 7,044,613, issued May 16, 2006).

STATEMENT REGARDING FEDERALLY SPONSORED RESEARCH

This invention was made with government support under Grant No. W911 NF-04-005, awarded by the Army Research Office. The government has certain rights in the invention.

The entire content of each of these applications and patents is incorporated herein by reference.

BACKGROUND

Technical Field

This disclosure relates to the capture of high resolution facial geometry and reflectance.

Description of Related Art

Modeling realistic human characters is frequently done using 3D recordings of the shape and appearance of real people across a set of different facial expressions to build blendshape facial models. See PIGHIN, F., HECKER, J., LISCHINSKI, D., SZELISKI, R., AND SALESIN, D. H. 1998, *Synthesizing realistic facial expressions from photographs, In Proceedings of the 25th Annual Conference on Computer Graphics and Interactive Techniques, ACM*, New York, N.Y., USA, SIGGRAPH '98, 75-84; ALEXANDER, O., ROGERS, M., LAMBETH, W., CHIANG, J.-Y., MA, W.-C., WANG, C.-C., AND DEBEVEC, P. 2010, *The Digital Emily Project: Achieving a photoreal digital actor, IEEE Computer Graphics and Applications* 30 (July), 20-31. Believable characters which cross the "Uncanny Valley" require high-quality geometry, texture maps, reflectance properties, and surface detail at the level of skin pores and fine wrinkles. Unfortunately, there does not yet appear to have been a technique for recording such datasets which is near instantaneous and relatively low-cost.

While some facial capture techniques are instantaneous and inexpensive, see BEELER, T., BICKEL, B., BEARDSLEY, P., SUMNER, B., AND GROSS, M. 2010; High-quality single-shot capture of facial geometry, ACM Trans. Graph. 29 (July), 40:1-40:9; BRADLEY, D., HEIDRICH, W., POPA, T., AND SHEFFER, A. 2010; High resolution passive facial performance capture, ACM Trans. Graph. 29 (July), 41:1-41:10, these may not provide lighting-independent texture maps, specular reflectance information, and/or high-resolution surface normal detail for relighting. In contrast, techniques which use multiple photographs from spherical lighting setups, see WEYRICH, T., MATUSIK, W., PFISTER, H., BICKEL, B., DONNER, C., TU, C., MCANDLESS, J., LEE, J., NGAN, A., JENSEN, H. W., AND GROSS, M. 2006, Analysis of human faces using a measurement-based skin reflectance model, ACM TOG 25, 3, 1013-1024; GHOSH, A., FYFFE, G., TUNWATTANAPONG, B., BUSCH, J., YU, X., AND DEBEVEC, P. 2011, Multiview face capture using polarized spherical gradient illumination, ACM Trans, Graphics (Proc. SIGGRAPH Asia) 30, 6, may capture such reflectance properties, but may come at the expense of longer capture times and complicated custom equipment. More Detailed Description of Various Approaches Passive Multi-View Stereo There is a rich history of work in the computer vision literature on passive multi-view stereo reconstruction of scenes including faces. FURUKAWA, Y., AND PONCE, J. 2009, *Dense 3D motion capture or human faces, In Proc. of CVPR 09*, proposed multi-view stereopsis as a match-expand filter procedure that produces dense patch reconstruction from an initial set of sparse correspondences. However, since subsurface scattering typically blurs surface detail, see RAMELLA-ROMAN, J. C. 2008, *Out of plane polarimetric imaging of skin: Surface and subsurface effect, In Optical Waveguide Sensing and Imaging*, W. J. Bock, I. Gannot, and S. Taney, Eds., *NATO Science for Peace and Security Series B: Physics and Bio*541 physics. Springer Netherlands, 259-269, "10.1007/978-1-4020-542 6952-9_12", for semi-translucent materials such as skin, the resolution which can be recovered for faces may be limited.

Passive multi-view stereo has been employed by Beeler et al. 2010 and Bradley et al. 2010, supra, to reconstruct high quality facial geometry under diffuse illumination. Beeler et al. apply mesoscopic augmentation as in GLENCROSS, M., WARD, G. J., MELENDEZ, F., JAY, C., LIU, J., AND HUBBOLD, R. 2008, *A perceptually validated model for surface depth hallucination, ACM Trans Graph* 27, 3 (August), 59:1-59:8, to hallucinate detailed geometry, which, while not metrically accurate, may increase the perceived realism of the models by adding the appearance of skin detail.

Valgaerts et al. present a passive facial capture system which achieves high quality facial geometry reconstruction under arbitrary uncontrolled illumination. VALGAERTS, L., W U, C., BRUHN, A., SEIDEL, H.-P., AND THEOBALT, C. 2012, *Lightweight binocular facial performance capture under uncontrolled lighting, ACM Transactions on Graphics (Proceedings of SIGGRAPH Asia 2012)* 31, 6 (November), 187:1-187:11. They reconstruct base geometry from stereo correspondence and incorporate high frequency surface detail using shape from shading and incident illumination estimation as in Wu et al. W U, C., VARANASI, K., LIU, Y., SEIDEL, H.-P., AND THEOBALT, C. 2011, *Shading-based dynamic shape refinement from multi-view video under general illumination, In Proceedings of the 2011 International Conference on Computer Vision, ICCV '11*, 1108-1115. The technique may achieve impressive results for uncontrolled lighting, but may not take full advantage of specular surface reflections to estimate detailed facial geometry and reflectance.

Structured Lighting Systems

Numerous successful techniques using structured light projection have addressed 3D facial scanning, including applications to dynamic facial capture, see RUSINKIEWICZ, S., HALL-HOLT, O., AND LEVOY, M. 2002, *Real-time 3D model acquisition, ACM TOG* 21, 3, 438-446; ZHANG, L., SNAVELY, N., CURLESS, B., AND SEITZ, S. M. 2004, *Spacetime faces: high resolution capture for modeling and animation, ACM TOG* 23, 3, 548-558. However, these techniques may operate at a lower resolution than may be needed to record high resolution facial detail and may not specifically address reflectance capture.

Diffuse Photometric Stereo Photometric Stereo,

WOODHAM, R. J. 1978, Photometric stereo: A reflectance technique for determining surface orientation from image intensity, In Proc. SPIE's 22nd Annual Technical Symposium, vol. 155, has been applied to recover dynamic facial performances using simultaneous illumination from a set of red, green and blue lights, see HERNANDEZ, C., VOGIATZIS, G., BROSTOW, G. J., STENGER, B., AND CIPOLLA, R. 2007. Non-rigid photometric stereo with colored lights. In Proc. IEEE International Conference on Computer Vision, 1-8; KLAUDINY, M., HILTON, A., AND EDGE, J. 2010, High-detail 3D capture of facial performance, In International Symposium 3D Data Processing, Visualization and Transmission (3DPVT). However, these techniques may either be data intensive or may not recover reflectance information. An exception may be Georghiades, see GEORGHIADES, A. 2003, *Recovering 3-D shape and reflectance from a small number of photographs, In Rendering Techniques,* 230-240, who recovers shape and both diffuse and specular reflectance information for a face lit by multiple unknown point lights. The problem is formulated as uncalibrated photometric stereo and a constant specular roughness parameter is estimated over the face, achieving a medium scale reconstruction of the facial geometry. ZICKLER, T., MALLICK, S. P., KRIEGMAN, D. J., AND BELHUMEUR, P. N. 2008, *Color subspaces as photometric invariants, Int. J. Comput. Vision* 79, 1 (August), 13-30, showed that photometric invariants allow photometric stereo to operate on specular surfaces when the illuminant color is known. The practicality of photometric surface orientations in computer graphics has been demonstrated by RUSHMEIER, H., TAUBIN, G., AND GUÉZIEC, A. 1997, *Applying shape from lighting variation to bump map capture, In Rendering Techniques,* 35-44, for creating bump maps, and NEHAB, D., RUSINKIEWICZ, S., DAVIS, J., AND RAMAMOORTHI, R. 2005, *Efficiently combining positions and normals for precise 3D geometry, ACM TOG* 24, 3, 536-54, for embossing such surface orientations for improved 3D geometric models. HERTZMANN, A., AND SEITZ, S. M. 2005, *Example-based photometric stereo: Shape reconstruction with general, varying brdfs, PAMI* 27, 8, 1254-1264, showed that with exemplar reflectance properties, photometric stereo can be applied accurately to materials with complex BRDF's, and GOLDMAN, D. B., CURLESS, B., HERTZMANN, A., AND SEITZ, S. M. 2005, *Shape and spatially-varying brdfs from photometric stereo, In ICCV,* 341-348, presented simultaneous estimation of normals and a set of material BRDFs. However, all of these may require multiple lighting conditions per viewpoint, which may be prohibitive to acquire using near-instant capture with commodity DSLRs.

Specular Photometric Stereo

Most of the above techniques have exploited diffuse surface reflectance for surface shape recovery. This is because typically specular highlights may not be view-independent and may shift across the subject as the location of the light and camera changes. ZICKLER, T. E., BELHUMEUR, P. N., AND KRIEGMAN, D. J. 2002, *Helmholtz stereopsis: Exploiting reciprocity for surface reconstruction, Int. J, Comput Vision* 49,2-3, 215-227, exploits Helmholtz reciprocity to overcome this limitation for pairs of cameras and light sources. Significant work, see CHEN, T., GOESELE, M., AND SEIDEL, H. P. 2006, *Mesostructure from specularities, In CVPR,* 1825-1832; WEYRICH et al, supra; and DEBEVEC, P., HAWKINS, T., TCHOU, C., DUIKER, H.-P., SAROKIN, W., AND SAGAR, M. 2000, *Acquiring the reflectance field of a human face, In Proceedings of the 27th Annual Conference on Computer Graphics and Interactive Techniques,* ACM Press/Addison-Wesley Publishing Co., New York, N.Y., USA, SIGGRAPH '00, 145-156, analyzes specular reflections to provide higher-resolution surface orientations for translucent surfaces. MA, W.-C., HAWKINS, T., PEERS, P., CHABERT, C.-F., WEISS, M., AND DEBEVEC, P. 2007, *Rapid acquisition of specular and diffuse normal maps from polarized spherical gradient illumination, In Rendering Techniques,* 183-194; and GHOSH et al, supra, perform photometric stereo using spherical gradient illumination and polarization difference imaging to isolate specular reflections, recording specular surface detail from a small number of images. While these techniques can produce high quality facial geometry, they may require a complex acquisition setup such as an LED sphere and many photographs.

Diffuse-Specular Separation

Both polarization and color space analysis can be used in separating diffuse and specular reflections, see NAYAR, S., FANG, X., AND BOULT, T. 1997, Separation of reflection components using color and polarization, IJCV 21, 3, 163-186. MALLICK, S. P., ZICKLER, T. E., KRIEGMAN, D. J., AND BELHUMEUR, P. N. 2005, Beyond lambert: Reconstructing specular surfaces using color, In CVPR, use a linear transform from RGB color space to an SUV color space where S corresponds to the intensity of monochromatic specular reflectance and UV correspond to the orthogonal chroma of the diffuse reflectance

SUMMARY

A system may almost instantly capturing high-resolution geometry and reflectance data of a portion of a human subject. The system may include multiple cameras, each oriented to controllably capture an image of the portion of the human subject from a different location in space; multiple lights, each oriented to controllably illuminate the portion of the human subject from a location in space significantly different than the location in space of the other lights; and a controller. The controller may divide the cameras into subgroups with each subgroup of cameras containing at least one camera and with each camera belonging to only one of the subgroups; cause each subgroup of cameras to sequentially capture a single image of the portion of the human subject; and cause at least one of the lights to light while each subgroup of cameras captures a single image of the portion of the human subject. The system may include an image processing system that generates the high resolution geometry and reflectance data based on only one image from each camera.

The lights and the cameras may be arranged so as to produce a set of observed specular reflections along an evenly distributed set of surface orientation vectors of the portion of the human subject.

The reflectance data may include a diffuse texture map of the portion of the human subject, a specular reflection map of the portion of the human subject, or a surface orientation map of the portion of the human subject.

The system may include a polarizer in front of at least one of the cameras and in front of at least one of the lights.

The system may include a polarizer in front of each of the cameras and in front of each of the lights.

The polarizer in front of at least one of the cameras and the polarizer in front of at least one of the lights may create at least one cross-polarized or parallel-polarized lighting condition.

The system may include a polarizing beam splitter between two of the cameras and the portion of the human subject A first of the lights may be near a first of the cameras and a second of the lights may be near a second of the cameras. The controller may cause the first of the lights to light when it causes the second of the cameras to capture the image of the subject and may cause the second of the lights to light when the first of the cameras captures the image of the portion of the human subject.

One of the lights may emit light towards the portion of the human subject from multiple angles.

The controller may cause the sequential capturing of single images by the subgroups of cameras to repeat as the portion of the human subject moves. The image processing system may generate the high resolution geometry and reflectance data based on only one image from each camera for each of the repetitions.

The portion of the human subject may be the face of the human subject.

A polarizing optical element may be between each camera and the portion of the human subject. A polarizer filter may be between each light and the portion of the human subject. A controller may cause all of the cameras to simultaneously capture a single image of the portion of the human subject while the portion of the human subject is illuminated by all of the lights. The specular reflections from the portion of the human subject that are captured by one of the cameras may have a color distribution across the portion of the human subject that is different than the specular reflections from the portion of the human subject that are captured by another of the cameras.

The lights may be arranged to produce a sum of red, green, and blue illumination gradients on three cardinal directions in one polarization state, combined with a complementary sum of red, green, and blue illumination gradients on the three opposing cardinal directions in another polarization state.

The controller may cause all of the lights to light while all of the cameras capture a single image of the subject.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1A illustrates an example of multi-view images shot under rapidly varying flash directions. FIG. 1B illustrates an example of refined geometry based on these images; FIG. 1C illustrates an example of diffuse/specular maps based on these images; and FIG. 1D illustrates an example of a rendering based on these images.

FIG. 6A illustrates an example of an initial base mesh from PMVS2. FIG. 6B illustrates the initial base mesh after an example of manual trimming. FIG. 6C illustrates an example of a refined mesh from the reflectance analysis, which has facial texture detail.

FIG. 7A illustrates an example of diffuse-specular separation detail of an original image; FIG. 7B illustrates an example of a diffuse component thereof; and FIG. 7C illustrates an example of a specular component thereof brightened 2×.

FIGS. 8A-8C illustrate examples of three adjacent specular highlights on a forehead, color-coded, illuminating different sets of surface normal, respectively.

FIG. 9A illustrates an example of diffuse albedo; FIG. 9B illustrates an example of diffuse normal; FIG. 9C illustrates an example of specular albedo; and FIG. 9D illustrates an example of specular normal.

FIG. 10 illustrates examples of renderings of recovered geometry and reflectance maps for four several subjects under novel viewpoint and lighting.

FIG. 11A illustrates an example of a photo; and FIG. 11B illustrates an example of a rendered model under similar viewpoint and lighting.

FIG. 13 illustrates an example of a light source which may have a linear polarizing filter placed in front of it.

FIG. 14 illustrates an example of a camera which may have a linear polarizing filter placed in front of its lens.

FIG. 15 illustrates an example of a polarizing beam splitter.

DETAILED DESCRIPTION OF ILLUSTRATIVE EMBODIMENTS

Figure 2:
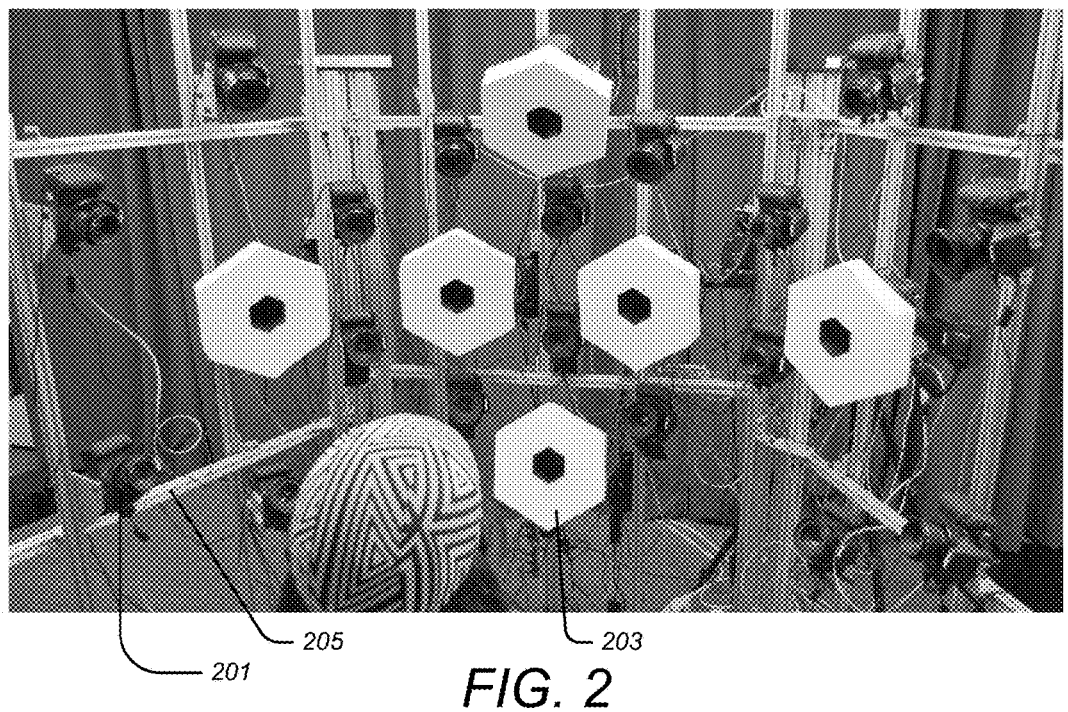
FIG. 2 illustrates an example of a facial capture setup that may include 24 entry-level DSLR cameras, six of which may have diffused ring flashes.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

A near-instant method for acquiring facial geometry and reflectance with twenty-four DSLR cameras and six flashes will now be disclosed. The flashes may be fired in rapid succession with subsets of the cameras, which may be specially arranged to produce an even distribution of specular highlights on the face. The total capture time may be less than a 67 ms blink reflex. A set of acquired images may be used to estimate diffuse color, specular intensity, and surface orientation at each point on the face. With a single photo per camera, the facial geometry may be optimized to maximize the consistency of diffuse reflection and minimize the variance of specular highlights using message passing for energy minimization. This may allow the final sub-millimeter surface detail to be obtained via shape-from-specularity, even though every photo may be from a different viewpoint. The system may use commodity components and produce models suitable for authoring high-quality digital human characters.

The near-instant facial capture technique may record high-quality facial geometry and reflectance using commodity hardware. A 24-camera DSLR photogrammetry setup similar to common commercial systems may be used. DSLR facial capture photogrammetry setups can be found at The Capture Lab, Autodesk, see LUO, L., LI, H., AND RUSINKIEWICZ, S. 2013, *Structure-aware hair capture, ACM Trans Graph* 32, 4 (July), Ten24, and Infinite Realities. A different number of cameras may be used instead. The system may use six ring flash units to light the face. A different number of flashes and/or a different type may be used instead.

However, instead of the usual process of firing all the flashes and cameras at once, each flash may be fired sequentially together with a subset of the cameras, with the exposures packed milliseconds apart for a total capture time of 66 ms, which may be faster than the blink reflex, see BIXLER, E. O., BARTLETT, N. R., AND LANSING, R. W. 1967, *Latency of the blink reflex and stimulus intensity. Perception & Psychophysics* 2, 11, 559-560. This arrangement may produce 24 independent specular reflection angles evenly distributed across the face, allowing a shape-from-specularity approach to obtain high-frequency surface detail. Unlike other shape-from-specularity techniques, the images may not be taken from the same viewpoint. So precise 3D geometry may be relied upon to derive surface orientations from the specular reflections. An initial estimate of the facial geometry may be refined until its derived reflectance best matches the specular appearance by performing energy minimization through a cost volume. The resulting system may produce accurate, high-resolution facial geometry and reflectance with near-instant capture in a relatively low-cost setup.

Features of this system include:

A near-instantaneous photometric capture setup for measuring the geometry and diffuse and specular reflectance of faces.

A camera-flash arrangement pattern which produces evenly distributed specular reflections over the face with a single photo per camera and fewer lighting conditions than cameras.

A cost volume approach leveraging diffuse and specular photometric observations for determining the best facial geometry and reflectance to match the observed facial appearance.

FIG. 1A illustrates an example of multi-view images shot under rapidly varying flash directions. FIG. 1B illustrates an example of refined geometry based on these images; FIG. 1C illustrates an example of diffuse/specular maps based on these images; and FIG. 1D illustrates an example of a rendering based on these images.

Hardware Setup and Capture Process

The capture setup may be designed to record accurate 3D geometry with both diffuse and specular reflectance information per pixel while minimizing cost and complexity and maximizing the speed of capture.

FIG. 2 illustrates an example of a facial capture setup that may include 24 entry-level DSLR cameras, an example of which is camera 201. Six (or a different number) of these may have diffused ring flashes, an example of which is ring flash 203. They may all be one (or a different number) meter from the face. A set of images taken with this arrangement can be seen in FIG. 1. In all, 24 (or a different number) entry-level DSLR cameras may be used along with a set of six (or a different number) ring flashes arranged on a gantry 205 as seen in FIG. 2.

Camera and Flash Arrangement

The capture rig may include 24 Canon EOS 600D entry-level consumer DSLR cameras, which may record RAW mode digital images at 5202×3565 pixel resolution. Using consumer cameras instead of machine vision video cameras may dramatically reduce cost, as machine vision cameras of this resolution can be very expensive and can require high-bandwidth connections to dedicated capture computers. But to keep the capture near-instantaneous, only a single image may be captured with each camera, as these entry-level cameras may require at least ¼ second before taking a second photograph.

A processing algorithm may determine fine-scale surface detail from specular reflections. A specular highlight may be observed from the majority of the surface orientations of the face. The surface orientations for four scanned facial models may be tabulated. Not surprisingly, over 90% of the orientations may fall between ±90° horizontally and ±45° vertically of straight forward. Thus, the flashes and cameras may be arranged to create specular highlights for an even distribution of normal directions within this space, as shown in FIG. 5.

One way to achieve this distribution would be to place a ring flash on the lens of every camera and position the cameras over the ideal distribution of angles. Then, if each camera fires with its own ring flash, a specular highlight may be observed back in the direction of each camera. However, this may require shooting each camera with its own flash in succession, which may lengthen the capture process and require many flash units.

Figure 3B:
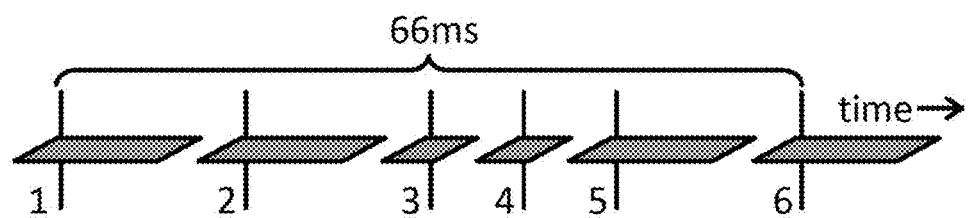
FIG. 3B illustrates an example of a firing sequence for the flashes (vertical lines) and camera exposures (solid strips).
Figure 3A:
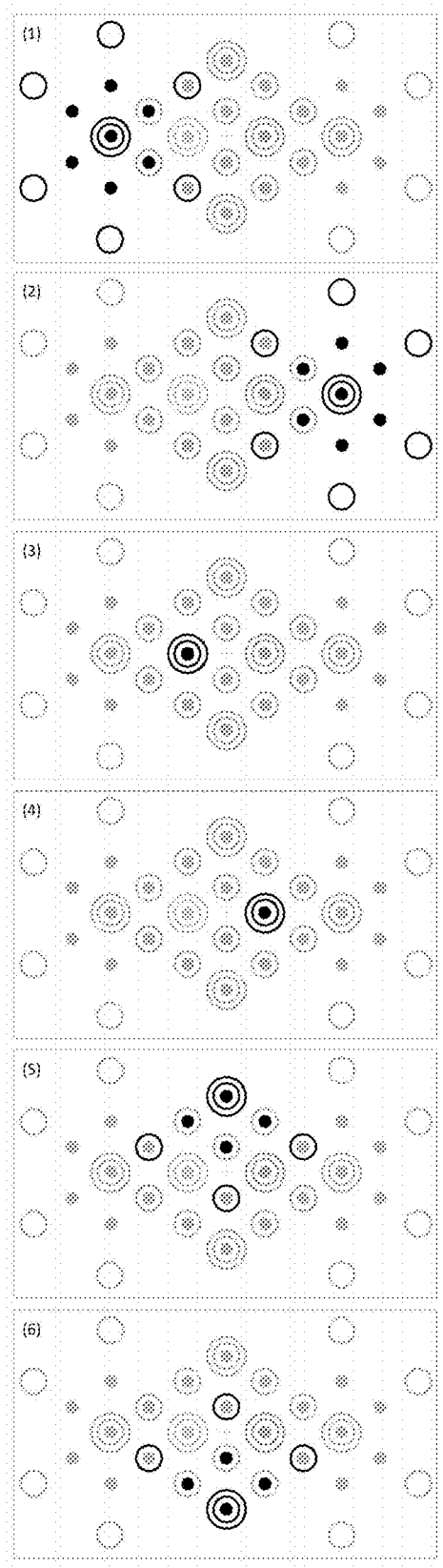
FIG. 3A illustrates an example of the location of flashes (double circles), cameras (single circles and double circles), and associated specular highlight half-angles (filled dots).

FIG. 3A (1-6) illustrates an example of the location of flashes (double circles), cameras (single circles and double circles), and associated specular highlight half-angles (filled dots). The central plus sign indicates the forward sight line of the subject. FIG. 3B illustrates an example firing sequence for the flashes (vertical lines) and camera exposures (solid strips). More time may be required for groups with more than one camera, to guarantee that all cameras in the group complete their shutter cycle.

Instead, the fact that position of a specular highlight may depend not just on the lighting direction but also on the viewing direction may be used. So multiple cameras may be fired at once with a flash to see different specular highlights according to the half-angles between the flash and the cameras.

Using this fact, the 24 cameras and six diffused Sigma EM-140 ring flashes may be arranged as in FIG. 3 to observe 24 specular highlights evenly distributed across the face. The circles indicate which cameras (single circles and double circles) fire with which of the six flashes (double circles) to create observations of the specular highlights on surfaces (solid discs). For example, six cameras to the subject's left shoot with flash "1", four cameras shoot with flash "5", and a single camera fires with flash "3". In this arrangement, most of the cameras may not be immediately adjacent to the flash they fire with, but they may create specular reflections along a half-angle which does point toward a camera which is adjacent to the flash, as shown in FIG. 4.

Figure 4:
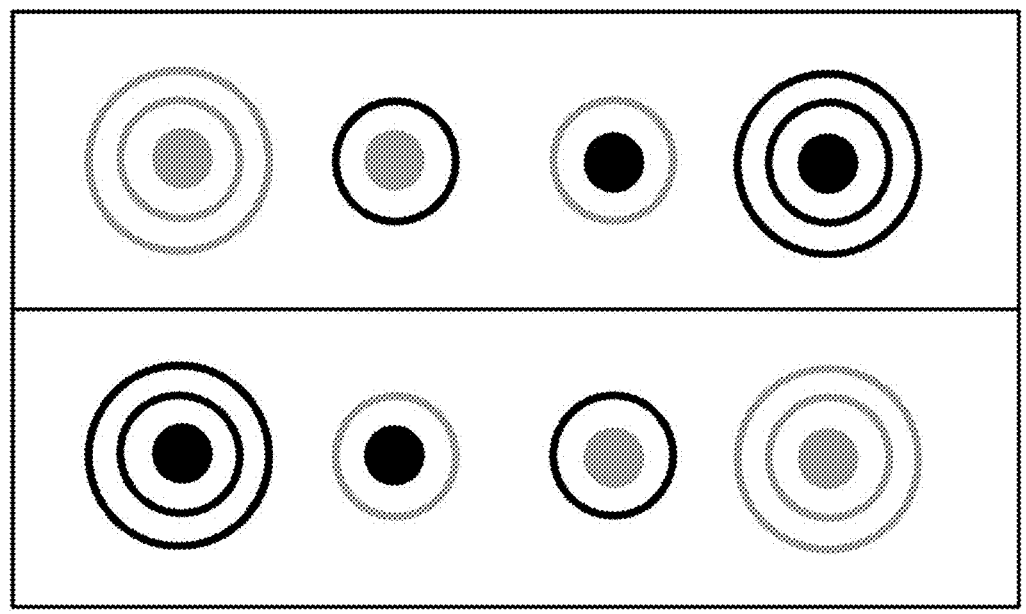
FIG. 4 illustrates an example of interleaved cameras and highlights: a subset of four images taken with the apparatus illustrated in FIG. 2.

FIG. 4 illustrates an example of interleaved cameras and highlights: a subset of four images taken with the apparatus. The first and third cameras fire with the left flash, producing specular highlights at surface normals pointing toward the first and second cameras. Likewise, the second and fourth cameras fire with the right flash, producing highlights toward the third and fourth cameras. Left-to-right, the highlights progress across the face.

Figure 5A:
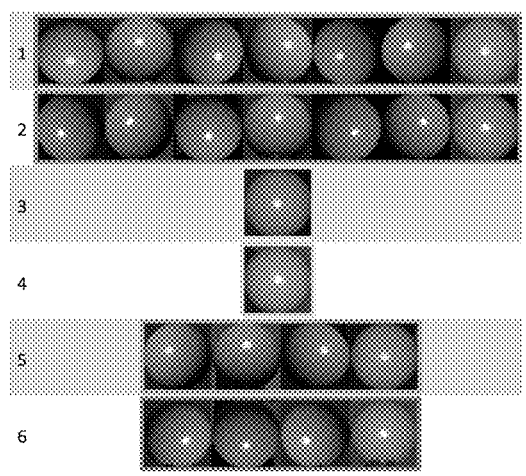
FIG. 5A illustrates an example of 24 images of a shiny plastic ball shot with the apparatus illustrated in FIG. 2.
Figure 5B:
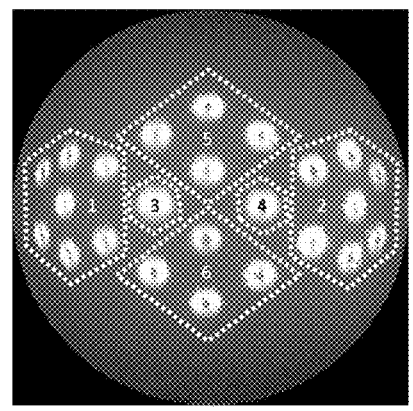
FIG. 5B illustrates all 24 images added together after being re-projected onto the ball's spherical shape as seen from the front.

The pattern of specular reflection angles observed can be seen on a plastic ball in FIG. 5. FIG. 5A illustrates an example of 24 images shot with the apparatus illustrated in FIG. 2 of a shiny plastic ball. FIG. 5B illustrates all 24 images added together after being re-projected onto the ball's spherical shape as seen from the front, showing 24 evenly-spaced specular reflections from the six flash lighting conditions. The numbers indicate which images correspond to each flash.

While the flashes themselves may release their light in less than 1 ms, the camera shutters may only synchronize to ½₀₀th of a second (5 ms). When multiple cameras are fired along with a flash, a time window of 15 ms may be required, since there may be some variability in when the cameras take a photograph. In all, with the six flashes, four of which fire with multiple cameras, a total recording time of 66 ms (¹⁄₁₅th sec) may be achieved as in FIG. 3(b). By design, this may be a shorter interval than the human blink reflex, see BIXLER, E. O., BARTLETT, N. R., AND LANSING, R. W. 1967, *Latency of the blink reflex and stimulus intensity.* Perception & Psychophysics 2, 11, 559-560.

Implementation Details

One custom component in the system may be a USB-programmable 80 MHz Microchip PIC32 micro controller which may trigger the cameras via a remote shutter release input. The flashes may be set to manual mode, full power, and may be triggered by their corresponding cameras via a "hot shoe." The camera centers may lie on a 1 m radius sphere, framing the face using inexpensive Canon EF 50 mm f/1.8 II lenses. A checkerboard calibration object may be used to focus the cameras and to geometrically calibrate the camera's intrinsic, extrinsic, and distortion parameters, with re-projection errors of below a pixel.

An X-Rite ColorChecker Passport was photographed to calibrate the flash color and intensity. With the flash illumination, a deep depth of field at an aperture of f/16 may be achieved with the camera at its minimal gain of ISO 100 to provide well-focused images with minimal noise. While the cameras have built-in flashes, these may not be used due to an Electronic Through-The-Lens (ETTL) metering process involving short bursts of light before the main flash. The ring flashes may be brighter and their locations may be derived from the camera calibrations. By design, there may be no flash in the subject's line of sight.

Alternate Designs

Other design elements considered for the system may include cross- and parallel-polarized lights and flashes, polarizing beam splitters, camera/flash arrangements exploiting Helmholtz reciprocity for stereo correspondence, see ZICKLER, T. E., BELHUMEUR, P. N., AND KRIEGMAN, D. J. 2002. *Helmholtz stereopsis: Exploiting reciprocity for surface reconstruction*, Int. J. Comput. Vision 49, 2-3, 215-227, and a floodlit lighting condition with diffuse light from everywhere. While these techniques offer advantages for reflectance component separation, robust stereo correspondence, and/or deriving a diffuse albedo map, each may require adding additional cameras or lights to the system. Instead, traditional diffuse/specular separation and stereo correspondence techniques may be sufficient.

Deriving Geometry and Reflectance

Various approaches may be employed to process the photographs into an accurate 3D model, plus maps of diffuse and specular reflectance. One approach may leverage passive stereo reconstruction to build an approximate geometric mesh of the face from the photographs. The diffuse and specular components of the photographs may be separated, and photometric stereo may be used to estimate diffuse photometric normals and albedo, and specular photometric normals and albedo, in each image. These images may be used to refine the geometric mesh of the face using a cost volume, which may evaluate the consistency of the facial reflectance properties as projected on to a series of slightly perturbed meshes. The volume may give low cost to points with consistent diffuse color in the 24 views, and high cost to points with inconsistent specular reflection, essentially trying to keep the specular highlights from the various half-vectors from falling on top of each other.

The lowest-cost facial geometry may then be solved for using Tree-Reweighted Message Passing, see KOLMOGOROV, V. 2006, Convergent tree-reweighted message passing for energy minimization, IEEE Trans. Pattern Anal. Mach. Intell, 28 (October), 1568-1583. From this refined geometry, the final diffuse and specular reflectance maps may be computed for the face.

Constructing the Base Mesh

A base mesh may be built using PMVS2 software (similar base mesh results may be obtained with Autodesk's 123D Catch or AGISoft's PhotoScan, see FURUKAWA, Y., AND PONCE, J. 2010, *Accurate, dense, and robust multiview stereopsis, IEEE Trans Pattern Anal Mach Intell.* 32, 8 (August), 1362-1376, using camera calibration from a calibration object and the 24 flash-lit photographs. The images may not all have the same lighting and may contain specular reflections and shadows, none of which may be ideal for passive stereo reconstruction.

However, there may be sufficiently dense views under similar-enough lighting for the algorithm to find enough matching points between the images to construct a geometric model of the face accurate to within a few millimeters FIG. 6A illustrates an example of an initial base mesh from PMVS2. FIG. 6B illustrates the initial base mesh after an example of manual trimming. FIG. 6C illustrates an example of a refined mesh from the reflectance analysis, which has facial texture detail. The mesh may be smoothed by manually trimming away extraneous surfaces, as shown in FIG. 6B. A minimally-distorted 4,096×4,096 pixel (u,v) texture map space may then be created, such as by using the commercial software UnFold 3D.

Diffuse-Specular Separation

Each of the images of the face may then be separated into its diffuse and specular reflectance components. The diffuse components may be used to provide refined matches between the views and build a lighting-independent diffuse component, and the specular component may be used to further refine the geometric surface through variance minimization and to derive surface orientation detail. From color calibration and since skin is dielectric, it can be assumed that the RGB specular color $\vec{s}$ in all images is (1,1,1). If the diffuse color $\vec{d}$ could be known, i.e., the RGB color of the subsurface scattered light at a given pixel, then it may be trivial to decompose the pixel's RGB color into its diffuse and specular components. However, due to different amounts of melanin and hemoglobin in the face, the diffuse color may vary across the face. While Mallick et al., see MALLICK, S. P., ZICKLER, T., BELHUMEUR, P. N., AND KRIEGMAN, D. J. 2006, Specularity removal in images and videos: A pde approach, In ECCV, uses neighboring pixel areas to infer the diffuse color, one could, like Debevec et al. 2000; Weyrich et al. 2006, supra, leverage the other images in the dataset.

Assume an examination of a point on a surface that projects into the different views in the dataset to pixel values $\vec{p}_i=[p_r^i p_g^i p_b^i]^T$, $i \in (1 \ldots k)$. Following Zickler et al. 2008 et al, supra, the RGB colors may be rotated into the so-called suv color space via a simple matrix transform such that the s component aligns with $\vec{s}$, yielding $[p_s^i p_u^i p_v^i]^T$. Then the chroma intensities $p_{uv}^i = \sqrt{p_u^{i}+p_v^{i}}$ may be employed to compute a chroma normal $\vec{n}_{uv}$ using Lambertian photometric stereo, as the u and v channels contain no specular highlight. As chroma information comes from light that has scattered deeply into the skin, the chroma normal map of a face may have an extremely soft quality to it, and may be unsuitable for constructing detailed surface geometry. A normal map constructed from specular reflection information may therefore be desired. This suggests separating the s channel into diffuse and specular components. As the dataset contains multiple illumination directions, the most saturated pixel may be used to establish a ratio of diffuse s to uv, allowing all $p_s^i$ to be separated. However, this may leave a significant amount of single scattering reflection in the specular component, which could confound the specular analysis. Thus, the s:uv ratio could instead be computed based on a blend of all the pixel values weighted $(1-(\vec{n}_{uv} \cdot \vec{h}_i)^{10})^2$ (where $\vec{h}_i$ is the halfway vector between the view vector and lighting direction for $\vec{p}_i'$). This may be empirically designed to suppress specular highlights. With this ratio and the chroma surface normal, it may be trivial to establish the diffuse albedo and to remove the diffuse component from all pixel values, leaving only specular highlights.

FIG. 7A illustrates an example of diffuse-specular separation detail of an original image; FIG. 7B illustrates an example of a diffuse component thereof; and FIG. 7C illustrates an example of a specular component thereof brightened 2×. These shows separation results for a subsection of a facial image. Blinn-Phong photometric stereo may then be employed to extract detailed specular surface normals from the specular highlight intensities, detailed below.

Specular Photometric Stereo

Given multiple observed pixel values $p_i$ of a surface point under differing illumination directions $\vec{l}_i$, it may be possible to recover the surface normal $\vec{n}$ and albedo p by leveraging certain assumptions about the reflectance properties of the surface. This process is known as photometric stereo Woodham 1978, supra. The photometric stereo equations are presented with a distant light assumption, and light intensity $\pi$. If the actual distances $r_i$ to the light sources are known, and the intensities $l_i$ are known, then the pixel values can be adjusted to conform to the assumptions by multiplying them by $\pi r_i^2/I_i$ before proceeding with photometric stereo.

The photometric stereo equations for exposition may be reviewed. In the Lambertian case, the lighting equation is $L\vec{\beta}=P$, where $L=[\vec{l}_1 \vec{l}_2 \ldots \vec{l}_k]^T$, $\vec{\beta}=p\vec{n}$, and $P=[p_1 p_2 \ldots p_k]^T$. Importantly, any i with $p_i=0$ are omitted, as the lighting equation does not hold. The solution via pseudoinverse is:

$$\vec{\beta}=(L^T L)^{-1} L^T P. \qquad (1)$$

In the Blinn-Phong case, the lighting equation may be expressed in terms of halfway vectors $\vec{h}_1$ instead of lighting directions, and may be more complicated. The dot product has an exponent $\alpha$, and an associated normalization factor to conserve energy, leading to the following:

$$H\vec{\gamma} = Q, \qquad (2)$$

where $$H = [\vec{h}_1 \vec{h}_2 \ldots \vec{h}_k]^T,$$

$$\vec{h}_i = \frac{\vec{v}_i + \vec{l}_i}{|\vec{v}_i + \vec{l}_i|},$$

$$Q = [p_1^{\frac{1}{\alpha}} p_2^{\frac{1}{\alpha}} \ldots p_k^{\frac{1}{\alpha}}]^T,$$

and $$\vec{\gamma} = \left(\frac{(\alpha+8)}{p}p\right)^{\frac{1}{\alpha}}\vec{n},$$

with $v_i$ the direction towards the viewer, and a the Blinn-Phong exponent. The solution via pseudoinverse has the same form:

$$\vec{\gamma}=(H^T H)^{-1} H^T Q \qquad (3)$$

The dense photometric stereo case may now be considered, with a large number of evenly spaced halfway vectors. In the limit ($k \to \infty$) we integrate h over the hemisphere $\Omega$ instead of summing over $h_i$:

$$\frac{1}{k}(H^T H) \to \frac{1}{\int_\Omega d\omega_{\vec{h}}} \int_\Omega \vec{h}\vec{h}^T d\omega_{\vec{h}} = \frac{1}{3}I, \qquad (4)$$

$$\frac{1}{k}H^T Q \to \frac{1}{\int_\Omega d\omega_{\vec{h}}} \int_\Omega \vec{h} p(\vec{h})^{\frac{1}{\alpha}} d\omega_{\vec{h}} = \frac{1}{3}\left(\frac{(\alpha+8)}{8}p\right)^{\frac{1}{\alpha}}\vec{n}, \qquad (5)$$

which remains in agreement with (3). However, if the exponent $\alpha$ is unknown, and an erroneous value $\hat{\alpha}$ is employed, the following may be observed:

$$\hat{\gamma} = (H^T H)^{-1} H^T \hat{Q} \to \frac{3}{\alpha/\hat{\alpha}+2}\left(\frac{(\alpha+8)}{8}p\right)^{\frac{1}{\hat{\alpha}}}\vec{n}. \qquad (6)$$

While $\vec{\gamma}$ and $\hat{\gamma}$ differ in magnitude, they may share the same direction. This may allow the Enough Lights Theorem to be stated:

Theorem 4.1 Enough Lights Theorem: In the limit of dense, evenly spaced halfway vectors, specular photometric stereo recovers the surface normal without knowledge of the specular exponent.

In practice, noise in the data and small errors in the diffuse-specular separation may crush the specular component to zero, even when the ideal Blinn-Phong model has a small positive value. One might try omitting these zero values (as in the Lambertian case), but most of the halfway vectors may go unused, rendering Theorem 4.1 unapplicable. Therefore, care may be taken not to erroneously omit halfway vectors when evaluating (3). The approach may include all available halfway vectors within a hemisphere defined by the surface normal of the Lambertian reflectance component, discarding halfway vectors that are occluded with respect to the base mesh. Remarkably, the integral in (6) may attain the same value, regardless of the orientation of the hemisphere $\Omega$, partly because the $\vec{h} \cdot \vec{n}$ term is not clamped to zero. In practice, the orientation of the hemisphere may be close enough to the true surface normal so that the values which should have been clamped to zero are small nonetheless, motivating the choice of using the Lambertian reflectance component surface normal. An $\hat{\alpha}$ value of 50 may be used to compute the specular surface normals in the results, which may be typical of human skin and may be close enough to obtain reasonable surface normals given the density of illumination provided by our apparatus.

Cost Volume Construction

A cost volume may be built representing diffuse photoconsistency and specular reflection consistency using a face sweep algorithm on the GPU, analogous to plane sweep algorithms used for traditional stereo. The final refined face mesh may be represented as a displacement map, displacing vertices of the base mesh along its surface normal directions. The GPU may be leveraged by processing the cost volume in small increments of displacement across the entire face, from −2.5 mm below the base mesh to 2.5 mm above the base mesh in 50 μm increments. At each increment, one layer of the cost volume may be computed by rasterizing the face mesh with the uniform displacement for the cost layer.

Using a fragment shader implemented in GLSL that operates on a single point in space, the diffuse-specular separation, color-subspace photometric stereo, and specular photometric stereo steps described above may be performed. Diffuse photo consistency may be computed by relighting the diffuse component for each lighting condition using the diffuse albedo and chroma normal, and computing the sum-of-squared-difference cost against the corresponding input images, weighted by the cosine between the chroma normal and view vector. To mitigate view-dependent reflectance and calibration errors, the relit diffuse component may be scaled to match the photograph in the uv channels before determining costs.

Figure 8A:
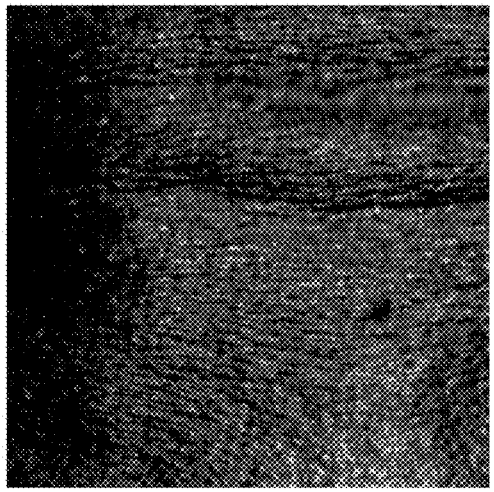
FIGS. 8A-8C illustrate examples of optimizing geometry from differing specular highlights.
Figure 8B:
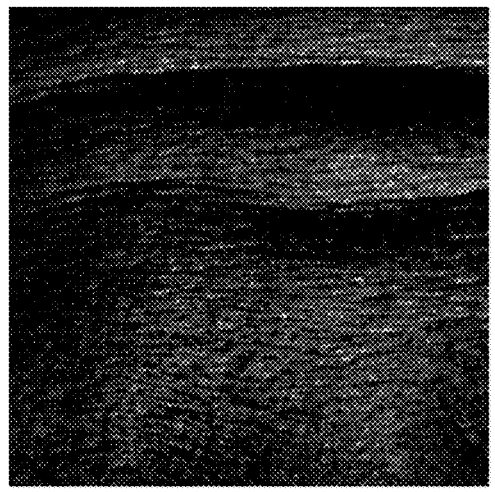
Figure 8C:
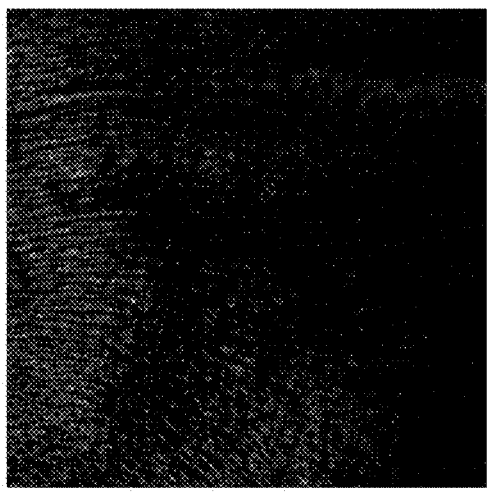
Figure 8D:
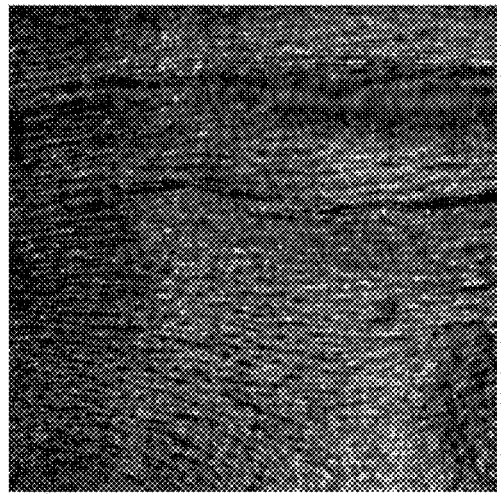
FIG. 8D illustrates an example of the sum of the specular highlights projected onto an optimized model, fitting the highlights together like a puzzle to minimize the specular variance per pixel.

FIG. 8A-8C illustrate examples of optimizing geometry from differing specular highlights. FIGS. 8A-8C illustrate examples of three adjacent specular highlights on a forehead, color-coded, illuminating different sets of surface normal, respectively. FIG. 8D illustrates an example of the sum of the specular highlights projected onto an optimized model, fitting the highlights together like a puzzle to minimize the specular variance per pixel.

Along with diffuse cost, a measure of specular reflection consistency may be added so that the specular reflections plausibly belong to the same surface. See FIG. 8. This may be complicated by the fact that each image sees different specular highlights corresponding to the different halfway vectors. However, because the highlights are evenly distributed (FIG. 5), the specular highlights projected from the different views may fit together like interleaved pieces of a puzzle, with minimal overlap, when the surface geometry is correct. Thus, the extent to which the specular highlights from the different halfway vectors fall on top of each other may be minimized when projected onto the model.

This cost may be computed as the weighted angular variance of the halfway vector of each view, weighted by the specular intensity observed in the view. Misalignment may generally result in overlapping highlights, leading to greater variance.

The final cost saved to the cost volume may sum the diffuse cost and specular cost, where the weights are the overall diffuse intensity and specular intensity in the image data. For robustness, the cost may be clamped to an upper threshold.

Solving the Refined Mesh with Energy Minimization

With the cost volume constructed, a final face mesh may be solved for which is the most consistent with the diffuse and specular photometric observations of the face. Since the refined mesh is represented as a displacement from the base mesh, the refinement may be reformed in terms of minimizing an energy function in terms of the displacement values dv at each vertex v:

$$E = \sum_{v} C_v(d_v) + \sum_{(v_1,v_2)} S_{v_1 v_2}(d_{v_1}, d_{v_2}), \quad (7)$$

where $C_v$ is the cost volume "column" for vertex v, $(v_1, v_2)$ and represents pairs of adjacent vertices, and S is a smoothing term respecting the specular surface normals. Kolmogorov's Convergent Tree-Reweighted Sequential Message Passing algorithm, see KOLMOGOROV, V. 2006, *Convergent tree-reweighted a message passing for energy minimization, IEEE Trans. Pattern Anal. Mach Intell*, 28 (October), 1568-1583, may be used with quadratic potentials to efficiently obtain a result free of discretization artifacts. As the energy in (8) is not quadratic, an iterative sliding weighted window scheme may be employed, at each iteration fitting the following quadratic approximation:

$$E \approx \sum_{v} Qfit_{d_v}\left(C_v(d_v) + \lambda(d_v - \hat{d}_v)^2\right) + \sum_{(v_1,v_2)} \sigma_{v_1 v_2}(d_{v_2} - d_{v_1} - \delta_{v_1 v_2})^2, \quad (8)$$

where $\lambda$ is the strength of the sliding weighted window centered around the previous iteration's result $\hat{d}_v$ (initialized to 0), $\sigma_{v_1 v_2}$ and $\delta_{v_1 v_2}$ parameterize the smoothing term (see below), and $Qfit_x(f(x))$ is the weighted least-squares quadratic fit to the function $f(x)$, weighted by $\exp(-f(x))$, which has been found to provide suitable approximations for energy minimization. The window weight $\lambda$ to 1 may be initialized, doubling it after each iteration, so that the quadratic fit tightens around a minimum. The outer quadratic fitting loop may be iterated five times, and the inner message passing loop twenty times. The smoothing term parameters are designed to penalize deviation from the photometric surface normals:

$$\delta_{v_1 v_2} = \frac{(\hat{x}_{v_1 v_2} - \vec{x}_{v_2}) \cdot \vec{n}_{v_1 v_2}}{\vec{n}_{v_2}^b \cdot \vec{n}_{v_1 v_2}} - \frac{(\hat{x}_{v_1 v_2} - \vec{x}_{v_1}) \cdot \vec{n}_{v_1 v_2}}{\vec{n}_{v_1}^b \cdot \vec{n}_{v_1 v_2}}, \quad (9)$$

$$\hat{x}_{v_1 v_2} = (\vec{x}_{v_1} + \hat{d}_{v_1} \vec{n}_{v_1}^b + \vec{x}_{v_2} + \hat{d}_{v_2} \vec{n}_{v_2}^b)/2, \quad (10)$$

$$\vec{n}_{v_1 v_2} = \vec{n}_{v_1} + \vec{n}_{v_2}, \quad (11)$$

$$\sigma_{v_1 v_2} = 1 \Big/ \big| \vec{x}_{v_1} + \hat{d}_{v_1} \vec{n}_{v_1}^b - \vec{x}_{v_2} - \hat{d}_{v_2} \vec{n}_{v_2}^b \big|^2 \quad (12)$$

where $\vec{x}_v$ is the position of the base mesh vertex v with base surface normal $\vec{n}_v^b$, and $\vec{n}_v$ is the photometric surface normal associated with the displacement having the least windowed cost $C_v(d_v) + \lambda(d_v - \hat{d}_v)^2$. The mesh refinement result respects both the cost volume and the specular surface normals, producing an accurate mesh with fine surface details.

Results

The system may be used to acquire a variety of subjects in differing facial expressions. The geometric models and reflectance maps for several expressions are available in the supplemental material. In addition to FIG. 1, the images on the first column of FIG. 10 and the third image in the third row show the mesoscopic geometry recovered using the algorithm. The quality of the reconstruction compares to passive lighting methods. However, the technique may also produce relightable reflectance maps that active lighting methods produce (FIG. 9).

Figure 9A:
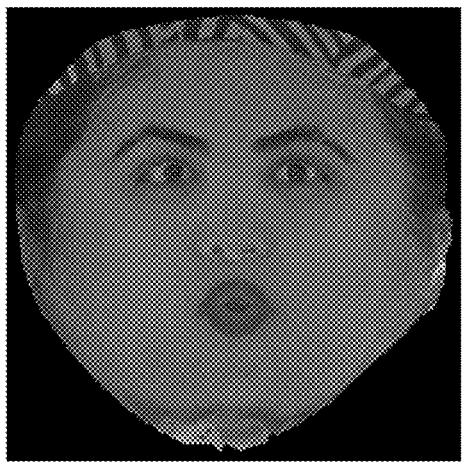
FIGS. 9A-9D illustrate examples of recovered reflectance maps.
Figure 9B:
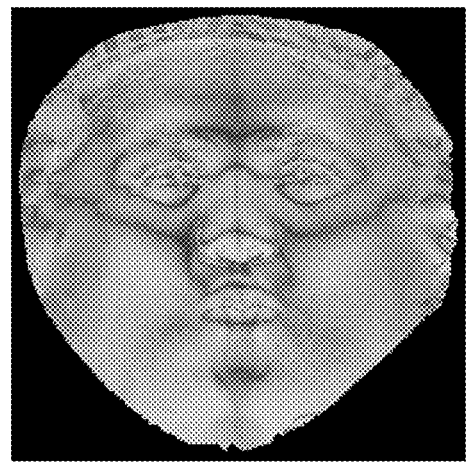
Figure 9C:
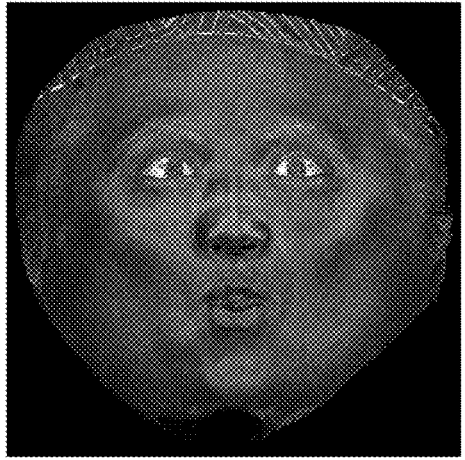
Figure 9D:

FIGS. 9A-9D illustrate examples of recovered reflectance maps. FIG. 9A illustrates an example of diffuse albedo; FIG. 9B illustrates an example of diffuse normal; FIG. 9C illustrates an example of specular albedo; and FIG. 9D illustrates an example of specular normal.

FIG. 10 illustrates examples of renderings of recovered geometry and reflectance maps for four several subjects under novel viewpoint and lighting. The maps used to create the lower-right subject can be seen in FIG. 9.

FIG. 11A illustrates an example of a photo; and FIG. 11B illustrates an example of a rendered model under similar viewpoint and lighting. FIG. 11 shows a validation rendering under novel pose and illumination shot with an additional camera not used in solving for the facial model. Although there is some difference in the diffuse BRDF and subsurface scattering, the skin detail and specular reflections show similar placement and texture.

Figure 12:
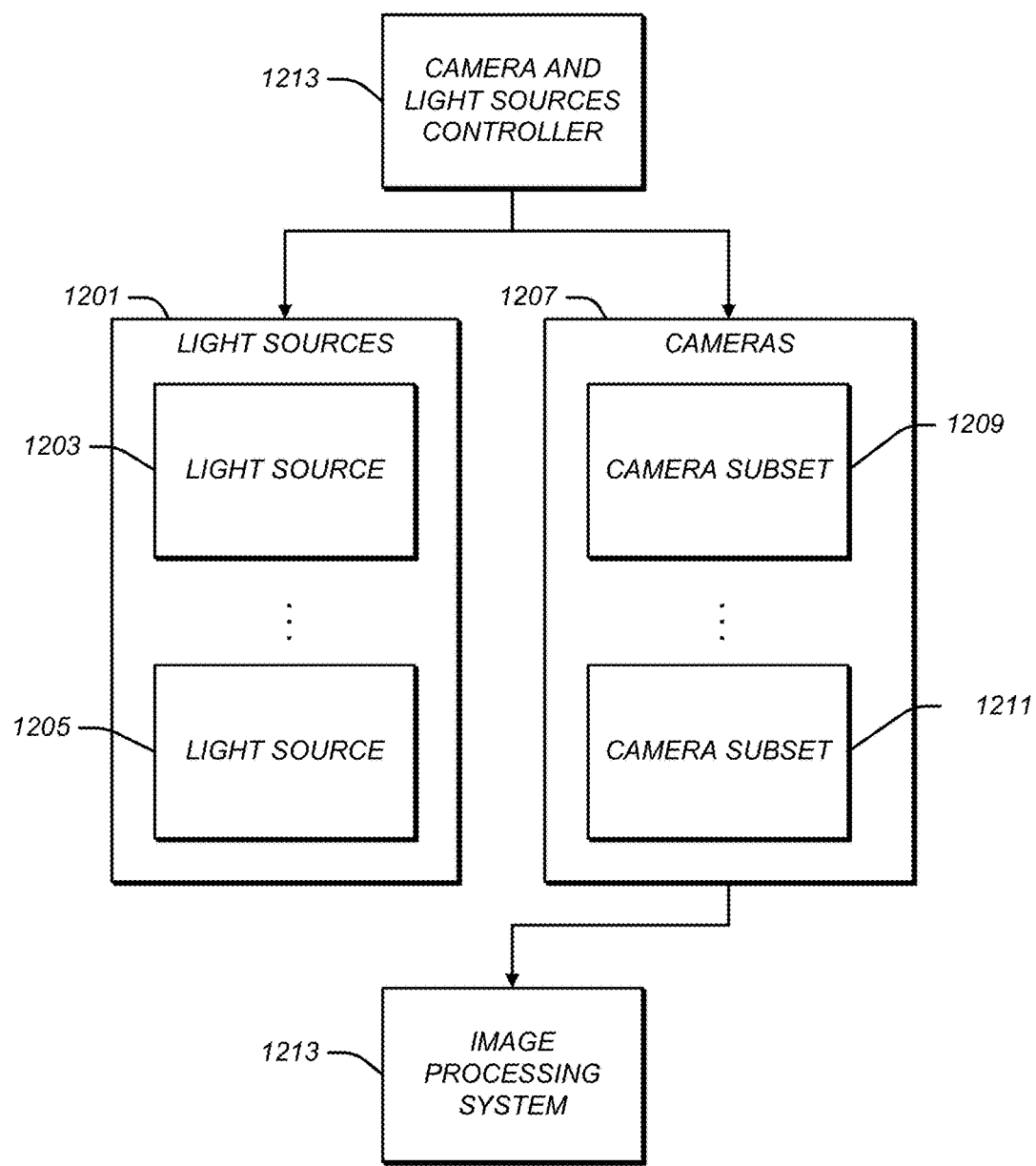
FIG. 12 is a block diagram of an example of a near-instant capture and high-resolution facial geometry and reflectance system.

FIG. 12 is a block diagram of an example of a near-instant capture and high-resolution facial geometry and reflectance system.

The surfaces of the eyes may not reconstruct well, due in part to the geometric disparity between the diffuse reflection of the iris and the specular reflection of the cornea; detecting eyes from the sharp specularities and modeling them specifically would be of interest. Modeling facial hair as in BEELER, T., BICKEL, B., NORIS, G., BEARDSLEY, P., MARSCHNER, S., SUMNER, R. W., AND GROSS, M. 2012, Coupled 3d reconstruction of sparse facial hair and skin, ACM Trans. Graph. 31, 4 (July), 117:1-117:10, may expand the utility of the system. Since the number of lighting conditions is small, the technique could in principal be applied to dynamic facial performances, using optical flow to bring the streams into temporal alignment with video cameras synchronized to alternating light sources.

All of the reflectance cues present within the data may not be exploited. A specular roughness term may not yet be solved. However, the high resolution surface detail may allow much of the spatially-varying skin BRDF to be exhibited directly from the geometry. The reflectance sharing, see ZICKLER, T., RAMAMOORTHI, R., ENRIQUE, S., AND BELHUMEUR, P. N. 2006, Reflectance sharing: Predicting appearance from a sparse set of images of a known shape, PAMI 28, 8, 1287-1302, may be used to derive improved diffuse and specular BRDFs of the skin. Also, the shadow transitions seen in the data could be analyzed to solve for subsurface scattering parameters for certain areas of the face.

FIG. 12 is a block diagram of an example of a near-instant capture and high-resolution facial geometry and reflectance system. As illustrated in FIG. 12, the system may include multiple light sources 1201, such as light sources 1203 and 1205, multiple cameras 1207 arranged in subsets of cameras, such as camera subsets 1209 and 1211, a camera and light source controller 1213, and an image processing system 1215.

The camera and flash controller 1213 may cause each camera to capture a single photograph of an object, such as a face, by causing the subsets of the cameras to sequentially take these photographs until all of the photographs are taken. Any of the specific approaches discussed above may be used.

The camera and flash controller 1213 may also cause one or more of the flashes 1201 to flash at different times during the camera capture process, also in accordance with any of the approaches discussed above.

One or more of the light sources 1205 may be a flash or a lamp that is momentarily turned on. One or more of the light sources may also be a single light source or a closely packed cluster of one or more light sources.

CONCLUSION

A near-instant capture technique has been described for recording the geometry and reflectance of a face from a set of still photographs lit by flash illumination. The technique leverages diffuse photoconsistency, photometric stereo, and specular reflections simultaneously to solve for facial shape and reflectance which best matches the input photographs. As such, it is able to produce such data at high resolution and at substantially lower cost than more complex reflectance measurement setups.

The various algorithms and other image processing approaches that have been discussed may be implemented with software that includes programming instructions and that may include associated data and libraries. When included, the programming instructions are configured to implement one or more algorithms or other processing techniques, as recited herein. The description of each function that is performed also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The controller may cause lights surrounding the subject from all directions to light while one subgroup of cameras captures photographs. The lights may be, for example, ring flashes, strobes, soft boxes, light panels, digital projectors, or LEDs. The lights may include colored lights or white lights. The cameras may be, for example, digital still cameras, machine vision cameras, video cameras, or cinema cameras. The subject may be human or non-human. The apparatus may be, for example, situated primarily to the front of the subject or alternatively surround the subject. The number of cameras or subgroups may differ, as well as the groupings of the subgroups and the order in which the subgroups capture photographs.

A near-instant method may acquire facial geometry and reflectance with seven DSLR cameras and a set of red, green and blue lights arranged in a sphere surrounding a human subject. The lights may be lit in conjunction with the cameras taking simultaneous photographs. A set of acquired images may be used to estimate diffuse color, specular intensity, and surface orientation at each point on the face. With a single photo per camera, the facial geometry may be optimized to maximize the consistency of facial texture using stereo photogrammetry. This may allow the final sub-millimeter surface detail and reflectance to be obtained via polarization difference imaging, even though every photo may be from a different viewpoint.

The near-instant facial capture technique may record high-quality facial geometry and reflectance using commodity hardware. DSLR facial capture photogrammetry setups can be found, for example, at The Capture Lab, Autodesk, see LUO, L., LI, H., AND RUSINKIEWICZ, S. 2013, *Structure-aware hair capture, ACM Trans Graph* 32, 4 (July), Ten24, and Infinite Realities, the content of which is incorporated herein by reference. A different number of cameras may be used instead. The system may use 2,040 color LEDs to light the face. A different number of LEDs and/or a different type of light may be used instead.

The lights may have polarizing filters placed in front of them so that half the lights are polarized horizontally and half are polarized vertically. The cameras may be divided into two subgroups, one with horizontal polarizing filters in front of the lenses and the other with vertical polarizing filters in front of the lenses, so that one subgroup of cameras images light primarily originating from the horizontally polarized lights, and the other subgroup of cameras images light primarily originating from the vertically polarized lights.

The lights may be arranged so that horizontally polarized and vertically polarized lights are evenly distributed over the sphere surrounding the subject. The vertically polarized lights may emit a combination of gradient illumination patterns including red light that is dark to light from left to right, green light that is dark to light from bottom to top, and blue light that is dark to light from back to front. The horizontally polarized lights may emit a complementary combination of illumination patterns including red light that is dark to light from right to left, green light that is dark to light from top to bottom, and blue light that is dark to light from front to back.

Other design elements for the system may include left circular and right circular polarization in place of horizontal and vertical linear polarization, colors of light other than red, green, or blue, and/or the use of more than two orientations or types of polarizing filters on the lights or in front of the cameras. The lights may be left on when the cameras are not capturing, or they may be dimmed, or turned off.

Various approaches may be employed to process the photographs into an accurate 3D model, plus maps of diffuse and specular reflectance. One approach may leverage passive stereo reconstruction to build an approximate geometric mesh of the face from the photographs. A specular reflection vector may be estimated as the difference between the images from a vertically polarized camera and a horizontally polarized camera, sampled at the projected position of a surface point, with the red, green, and blue channels interpreted as x, y, and z dimensions. The specular albedo may be estimated as the magnitude of the specular reflection vector. The diffuse albedo may be estimated as the sum of the images from a vertically polarized camera and a horizontally polarized camera, sampled at the projected position of a surface point, minus in each color channel the specular albedo estimated at the same point. A view vector may be estimated as the average of the two direction vectors from the surface point towards the vertically polarized camera and towards the horizontally polarized camera. A photometric surface normal may be estimated as the specular reflection vector direction plus the view vector, normalized. The photometric surface normals may be used to refine the geometric mesh of the face using numerical optimization to minimize a cost function based on the difference between the photometric normals and geometric normals.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

FIG. 13 illustrates an example of a light source 1301 which may have a linear polarizing filter 1303 placed in front of it.

FIG. 14 illustrates an example of a camera 1401 which may have a linear polarizing filter 1403 placed in front of its lens.

FIG. 15 illustrates an example of a polarizing beam splitter. The polarizing beam splitter may split an incoming beam of light having both perpendicular (S) and parallel (P) polarization states into two beams, one having only perpendicular (S) polarization and one having only parallel (P) polarization, with respect to the beam splitter axes.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system for capturing high-resolution geometry and reflectance data of a portion of a human subject comprising:
    a plurality of cameras, each camera within the plurality of cameras being configured to capture an image of the portion of the human subject from a unique location in space;
    a plurality of lights, each light within the plurality of lights being configured to illuminate the portion of the human subject from a unique location in space; and
    a controller configured to:
        assign the plurality of cameras to a plurality of subgroups, each subgroup containing at least one camera and each camera belonging to only one subgroup, at least two of the subgroups being multi-camera subgroups having at least two cameras,
        assign each light of the plurality of lights to a corresponding subgroup, each subgroup containing at least one light and each light belonging to only one subgroup, each light of the multi-camera subgroups being positioned between two or more cameras within the respective multi-camera subgroup,
        sequentially actuate at least one camera and at least one light within each subgroup, each camera capturing a single image of the portion of the human subject and each light providing light to the portion of the human subject, and
    an image processor that generates the high resolution geometry and reflectance data based on only one image from each camera, and provides a photometric surface orientation measurement at each point on a surface of the portion of the human subject based on a varying appearance of each point resulting from the unique location of each light.

2. The system of claim 1, wherein the plurality of lights and the plurality of cameras are arranged so as to produce a set of observed specular reflections along an evenly distributed set of surface orientation vectors of the portion of the human subject.

3. The system of claim 1, wherein the reflectance data includes a diffuse texture map of the portion of the human subject, a specular reflection map of the portion of the human subject, or a surface orientation map of the portion of the human subject.

4. The system of claim 1, further comprising a polarizer in front of at least one camera within the plurality of cameras and in front of at least one light within the plurality of lights.

5. The system of claim 4, further comprising a polarizer in front of each camera within the plurality of cameras and in front of each light within the plurality of lights.

6. The system of claim 4, wherein the polarizer in front of at least one camera within the plurality of cameras and the polarizer in front of at least one light within the plurality of lights create at least one cross-polarized lighting condition.

7. The system of claim 4, wherein the polarizer in front of at least one camera within the plurality of cameras and the polarizer in front of at least one light within the plurality of lights create at least one parallel-polarized lighting condition.

8. The system of claim 1, further comprising a polarizing beam splitter between two of the cameras within the plurality of cameras and the portion of the human subject.

9. The system of claim 1, wherein a first light within the plurality of lights is located near a first camera within the plurality of cameras and a second light within the plurality of lights is located near a second camera within the plurality of cameras and wherein the controller actuates the first light when the second camera is actuated and the controller actuates the second light when the first camera is actuated.

10. The system of claim 1, wherein one of the lights within the plurality of lights emits light towards the portion of the human subject from multiple angles.

11. The system of claim 1, wherein:
    the controller causes the sequential capturing of single images by the subgroups of cameras to repeat as the portion of the human subject moves; and
    the image processor generates the high resolution geometry and reflectance data based on only one image from each camera within the plurality of cameras for each of the repetitions.

12. The system of claim 1, wherein the portion of the human subject is the face of the human subject.

13. A system for capturing high-resolution geometry and reflectance data of a portion of a human subject comprising:
    a plurality of cameras, each camera within the plurality of cameras being configured to capture an image of the portion of the human subject from a unique location in space;
    a polarizing optical element between each camera and the portion of the human subject;
    a plurality of lights, each light within the plurality of lights being configured to illuminate the portion of the human subject from a unique location in space;
    a polarizer filter between each light and the portion of the human subject;
    a controller configured to:
        assign the plurality of cameras to a plurality of subgroups, each subgroup containing at least one camera with at least two of the subgroups containing at least two cameras and each camera belonging to only one subgroup, assign each light of the plurality of lights to a corresponding subgroup, each subgroup containing at least one light, each light belonging to only one subgroup, and each light being concentric with a camera within the corresponding subgroup, sequentially actuate at least one camera and at least one light within each subgroup, each camera capturing a single image of the portion of the human subject while the portion of the human subject is illuminated by each light; and an image processor that generates the high resolution geometry and reflectance data based on only one image from each camera, and provides a photometric surface orientation measurement at each point on a surface of the portion of the human subject based on a varying appearance of each point resulting from the unique location of each light.

14. The system of claim 13, wherein the reflectance data includes a diffuse texture map of the portion of the human subject, a specular reflection map of the portion of the human subject, and a surface orientation map of the portion of the human subject.

15. The system of claim 13, further comprising a polarizing beam splitter between two of the cameras within the plurality of cameras and the portion of the human subject.

16. The system of claim 13, wherein the polarization filters between at least two cameras within the plurality of cameras and the portion of the human subject are of different types or have different orientations.

17. The system of claim 13, wherein the plurality of lights are arranged to produce a sum of red, green, and blue illumination gradients that are dark to light on three cardinal directions in one polarization state, combined with a complementary sum of red, green, and blue illumination gradients that are dark to light on the three opposing cardinal directions in another polarization state.

18. The system of claim 13, wherein the controller causes the plurality of lights to light while the plurality of cameras capture a single image of the subject.

19. The system of claim 13, wherein:

the controller causes the simultaneous capturing of single images by the plurality of cameras to repeat as the portion of the human subject moves; and the image processor generates the high resolution geometry and reflectance data based on only one image from each camera within the plurality of cameras for each of the repetitions.

20. The system of claim 13, wherein the portion of the human subject is the face of the human subject.

* * * * *